United States Patent
Burkhart

(10) Patent No.: US 7,073,645 B2
(45) Date of Patent: Jul. 11, 2006

(54) CONTROL OF A DRIVETRAIN

(75) Inventor: Hugo Burkhart, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 46 days.

(21) Appl. No.: 10/500,512

(22) PCT Filed: Jan. 15, 2003

(86) PCT No.: PCT/EP03/00317

§ 371 (c)(1),
(2), (4) Date: Jun. 30, 2004

(87) PCT Pub. No.: WO03/060353

PCT Pub. Date: Jul. 24, 2003

(65) Prior Publication Data

US 2005/0103595 A1     May 19, 2005

(30) Foreign Application Priority Data

Jan. 18, 2002   (DE) ................................ 102 01 838

(51) Int. Cl.
*F16H 61/02* (2006.01)
*E02F 9/20* (2006.01)

(52) U.S. Cl. .................... 192/3.23; 192/3.57; 192/3.63

(58) Field of Classification Search .................... None
See application file for complete search history.

(56) References Cited

U.S. PATENT DOCUMENTS

| | | | |
|---|---|---|---|
| 3,187,497 A | 6/1965 | Granryd | |
| 3,424,029 A | 1/1969 | Horsch et al. | |
| 4,015,482 A | 4/1977 | Ito et al. | |
| 4,598,545 A | 7/1986 | Harada | |
| 4,776,751 A | 10/1988 | Saele | |
| 5,040,648 A | 8/1991 | Mitchell et al. | |
| 5,456,333 A | 10/1995 | Brandt et al. | |
| 5,613,581 A * | 3/1997 | Fonkalsrud et al. ........ | 192/3.23 |

FOREIGN PATENT DOCUMENTS

| | | |
|---|---|---|
| DE | 26 13 300 | 10/1976 |
| DE | 35 10 803 A1 | 4/1986 |
| DE | 197 58 240 A1 | 12/1998 |
| EP | 0 475 918 A2 | 3/1992 |
| WO | WO 95/01520 | 1/1995 |

* cited by examiner

Primary Examiner—Rodney H. Bonck
(74) Attorney, Agent, or Firm—Davis & Bujold, P.L.L.C.

(57) ABSTRACT

A control of a drive train for a wheel loader having one pressure-medium actuated brake and one transmission operated via a torque converter and at least one forward and/or reverse gear respectively actuated via a power shift clutch and one power take off wherein, when a predetermined value of the power delivered by the transmission to the power take off is exceeded, the pressure of the engaged power shift clutch for the forward or reverse gear is reduced to a residual level.

6 Claims, No Drawings

CONTROL OF A DRIVETRAIN

This application is a national stage completion of PCT/EP03/00317 filed Jan. 15, 2003 which claims priority from German Application Ser. No. 102 01 838.3 filed Jan. 18, 2002.

FIELD OF THE INVENTION

The invention relates to a control of a drive train, especially for wheel loaders.

BACKGROUND OF THE INVENTION

Wheel loaders are often equipped with a shovel actuated via a power takeoff (PTO) of the power shift transmission, for example, for filling and emptying or conventional power shift transmission of wheel loaders keep the power shift clutch closed while filling and emptying the shovel or "when operating on the wall" and thus a large part of the input power becomes heated in the torque converter. To overcome said disadvantage, it is known to open the power shift clutch starting from a specific brake pressure upon the service brake in order that the torque converter does not absorb any more power and all the input power goes to the power takeoff of the power shift transmission of the wheel loader. One disadvantage here is that there is absolutely no more propelling force on the wheels of the wheel loader, since there has been an active deceleration and in addition no more gear is shifted when the power shift clutches are disengaged.

PCT/EP 95/01520 has disclosed a device for reducing the pressure of a power shift clutch used in transmission systems for working machines. In this prior art, a pressure-reducing valve is used to make a power shift clutch slip in the transmission so that the working machine moves slowly and, for example, can be moved exactly to a specific position. A relation to the requirements on wheel loader while filling/emptying the shovel or "when operating on the wall" is not to be understood from PCT/EP 95/01520.

The problem on which the invention is based is to provide a control of a drive train which assists a wheel loader during filling and emptying "when operating on the wall" overcoming the disadvantages of lack of propelling force on the wheels.

SUMMARY OF THE INVENTION

According to the invention a control of a drive train, specially for wheel loaders, has one pressure-medium actuated brake and one transmission operated via a torque converter. The transmission comprises at least one forward and/or reverse gear respectively actuatable via one power shift clutch and one power take off. According to the invention, when a predetermined value of the power delivered by the transmission to the power take off is exceeded, the pressure of the power shift clutch engaged for the forward or reverse gear is reduced to a residual level. As essential advantages of the inventive control of the drive train there result when moving full input power of the engine to the torque converter of the wheel loader and while filling or emptying the shovel or "when operating on the wall" the input power of the engine to the power take off so that heating by power is prevented in the torque converter. With the inventive control of the power train smaller coolers are possible. The power of the engine can be laid out weaker in case of equal size of the vehicle and the lifting or picking power of the wheel loader increased. With the inventive control of the drive train the load distribution to a transmission and power take off (PTO) is automatically optimized.

DE-PS 35 10 803 describes a pressure-reducing valve which makes possible a coupling and modulating function. The pressure-reducing valve has here the function of allowing a working vehicle to start quickly or jerkily so that a shovel loader, for example, can be jerkily pushed in the ground. This known pressure-reduction and the control thereof cannot be compared with the instant operating or utilization field by which the opposite is to be obtained.

According to a preferred development of the invention, when a predetermined value of the power delivered by the transmission to the power take off is exceeded, the ratio of the transmission is changed or the power shift clutch for the 1st forward gear is engaged so that the input force of the wheel loader is maintained as well as possible.

DETAILED DESCRIPTION OF THE INVENTION

The invention is described herebelow with reference to a preferred embodiment.

A control of a drive train of wheel loader has a pressure-medium actuated brake and a transmission operated via a torque converter. The transmission comprises several forward and/or reverse gears respectively actuated via a power shift clutch and one power take off on which a shovel is hinged.

When a predetermined value of the power delivered by the transmission to the power take off is exceeded, the pressure of the engaged power shift clutch for the forward or reverse gear is reduced to a residual level, the power shift clutch for the 1st forward gear is engaged and the pressure on the brake reduced so that the input force of the wheel loader is maintained as well as possible.

The invention claimed is:

1. A method of controlling a power train for a wheel loader having one pressure-medium actuated brake and one variable ratio transmission connected to an engine via a torque converter, the method of controlling the power train comprising the steps of:
   actuating at least one of a forward gear and a reverse gear of the transmission by a power shift clutch, and
   actuating a power-take-off from the transmission;
   determining a value of total transmission power supplied to the power-take-off;
   comparing the value of the transmission power supplied to the power-take-off with a predetermined value of power delivered by the transmission to the power-take-off;
   reducing a pressure of the power shift clutch for one of the forward and reverse gears to a residual level when the value of the transmission power supplied to the power-take-off exceeds the predetermined value of power delivered by the transmission to the power-take-off, and
   changing the ratio of the transmission when the predetermined value of the power delivered by the transmission to the power take off is exceeded, so that the ratio of the transmission changes in a manner such that an input force to the torque converter of the wheel loaded is maintained.

2. The method of controlling a power train for a wheel loader having one pressure-medium actuated brake and one variable ratio transmission operated via a torque converter as set forth in claim 1, the method of controlling the power train comprising the further steps of engaging a first forward gear when the predetermined value of the power delivered by the transmission to the power take off is exceeded, so that the input force of the wheel loader is maintained.

3. The method of controlling a power train for a wheel loader having one pressure-medium actuated brake and one variable ratio transmission operated via a torque converter as set forth in claim 1, the method of controlling the power train comprising the further step of reducing the pressure on the pressure-medium actuated brake when the predetermined value of power delivered by the transmission to the power take off is exceeded.

4. A power train control for a wheel loader comprising:
   a pressure-medium actuated brake
   a variable ratio transmission receiving a drive input from an engine via a torque converter, the variable ratio transmission comprising;
      a power shift clutch for actuating at least a forward and a reverse gear;
      a power take off receiving an actual value of power delivered by the transmission to the power take off;
   a predetermined value of power delivered by the transmission to the power take off stored in a drive train control; and
   a power shift clutch control state wherein the predetermined value of power delivered by the transmission to the power take off is exceeded by the actual value of power delivered by the transmission to the power take off and a pressure actuating of the power shift clutch for a forward or reverse gear is reduced to a residual level to provide slipping of the power shift clutch and ensure that the drive input from the engine through the torque converter and to the transmission is maintained.

5. The power train control for a wheel loader as set forth in claim 4 wherein the transmission further comprises a first forward gear being engaged when the predetermined value of the power delivered by the transmission to the power take off is exceeded by the actual value of power delivered by the transmission to the power take off.

6. The power train control for a wheel loader as set forth in claim 4 wherein a pressure on the pressure medium brake is reduced when the predetermined value of the power delivered by the transmission to the power take off is exceeded by the actual value of power delivered by the transmission to the power take off.

* * * * *